Dec. 31, 1929.  K. E. LYMAN ET AL  1,741,857
AUTOMATIC TRANSMISSION
Original Filed July 9, 1928  2 Sheets-Sheet 1

INVENTORS
KENNETH E. LYMAN
ROGER B. McMULLEN JR
BY
ATTORNEY

Dec. 31, 1929.   K. E. LYMAN ET AL   1,741,857
AUTOMATIC TRANSMISSION
Original Filed July 9, 1928   2 Sheets-Sheet  2
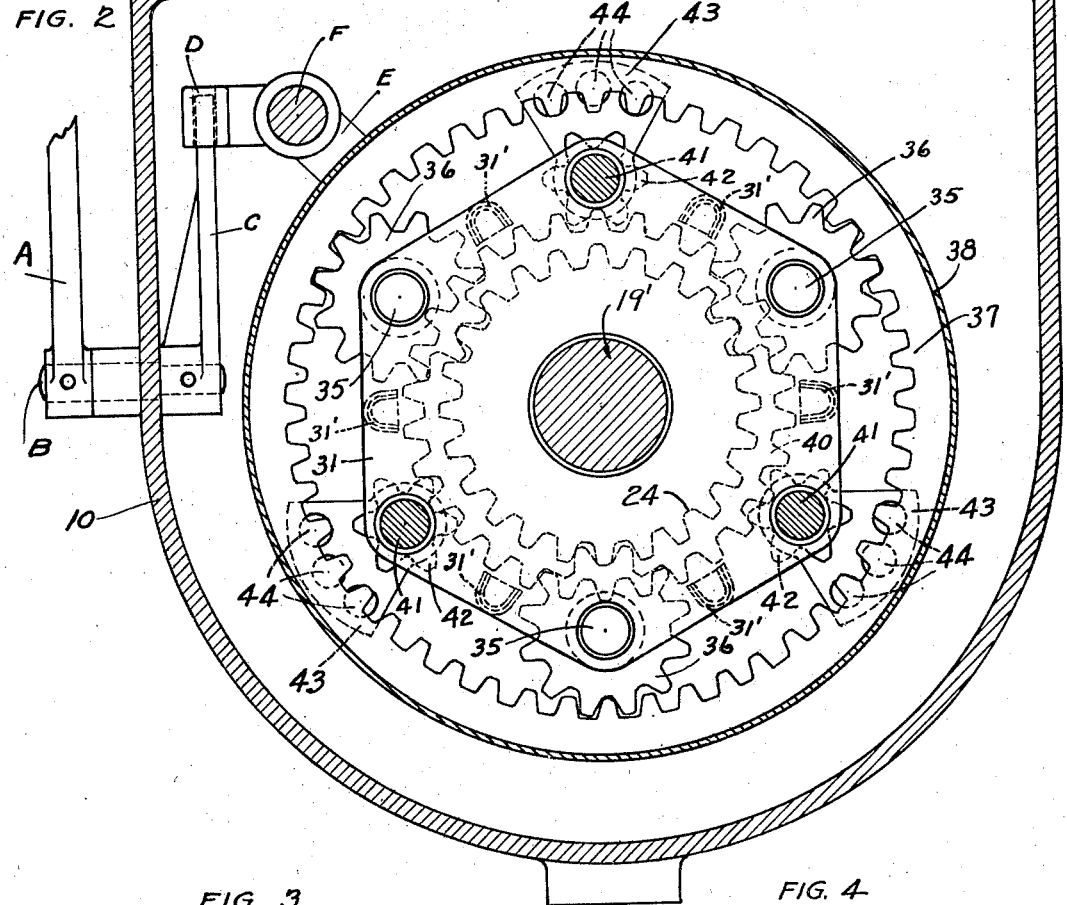
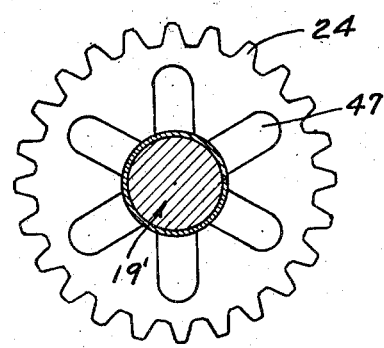
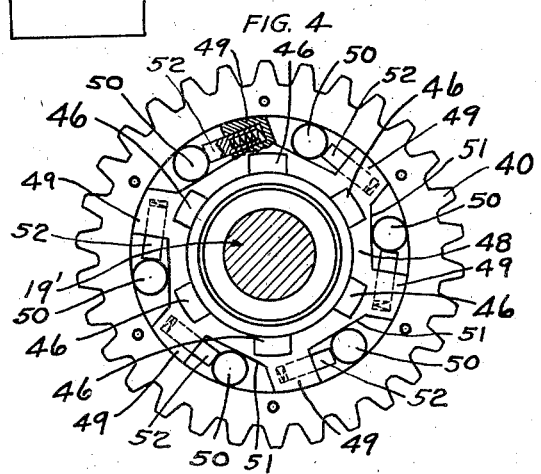
INVENTORS
KENNETH E. LYMAN
ROGER B. M<sup>c</sup>MULLEN JR
BY
ATTORNEY Patented Dec. 31, 1929

1,741,857

UNITED STATES PATENT OFFICE

KENNETH E. LYMAN, OF ROCKFORD, AND ROGER B. McMULLEN, JR., OF EVANSTON, ILLINOIS, ASSIGNORS TO AUTOMATIC TRANSMISSION COMPANY, OF ROCKFORD, ILLINOIS, A CORPORATION OF ILLINOIS

AUTOMATIC TRANSMISSION

Application filed July 9, 1928, Serial No. 291,298. Renewed November 18, 1929.

The present invention relates in general to power transmitting mechanisms and has particular reference to an improved transmission which is especially adaptable for use with motor driven vehicles.

The principal object of the invention resides in the provision of a mechanism of the character described which is capable of establishing a gradual speed ratio variation from zero to maximum controlled automatically by the variations in torque and speed between a driving element and an element to be driven.

While the foregoing explains briefly the nature of the invention other objects and advantages not herein specifically referred to will be readily appreciated upon a full comprehension of the novel features presented in the construction arrangement and manner of operation of the transmission.

In order that the invention may be readily understood an embodiment of the same is set forth in the accompanying drawings and in the following detailed description.

It is understood that those skilled in the art may make various changes in the construction and arrangement of the parts without departing from the spirit and scope of the invention as defined in the subjoined claims, and I therefore do not wish to be restricted to the precise construction contained herein.

In the drawings;

Figure 2 is a transverse section taken on the line 2—2 Figure 1, looking in the direction of the arrows.

Figure 3 is a detailed view in side elevation showing one face of the primary sun gear.

Figure 4 is a view in side elevation of the secondary sun gear showing the overrunning clutch associated therewith.

Figure 1:
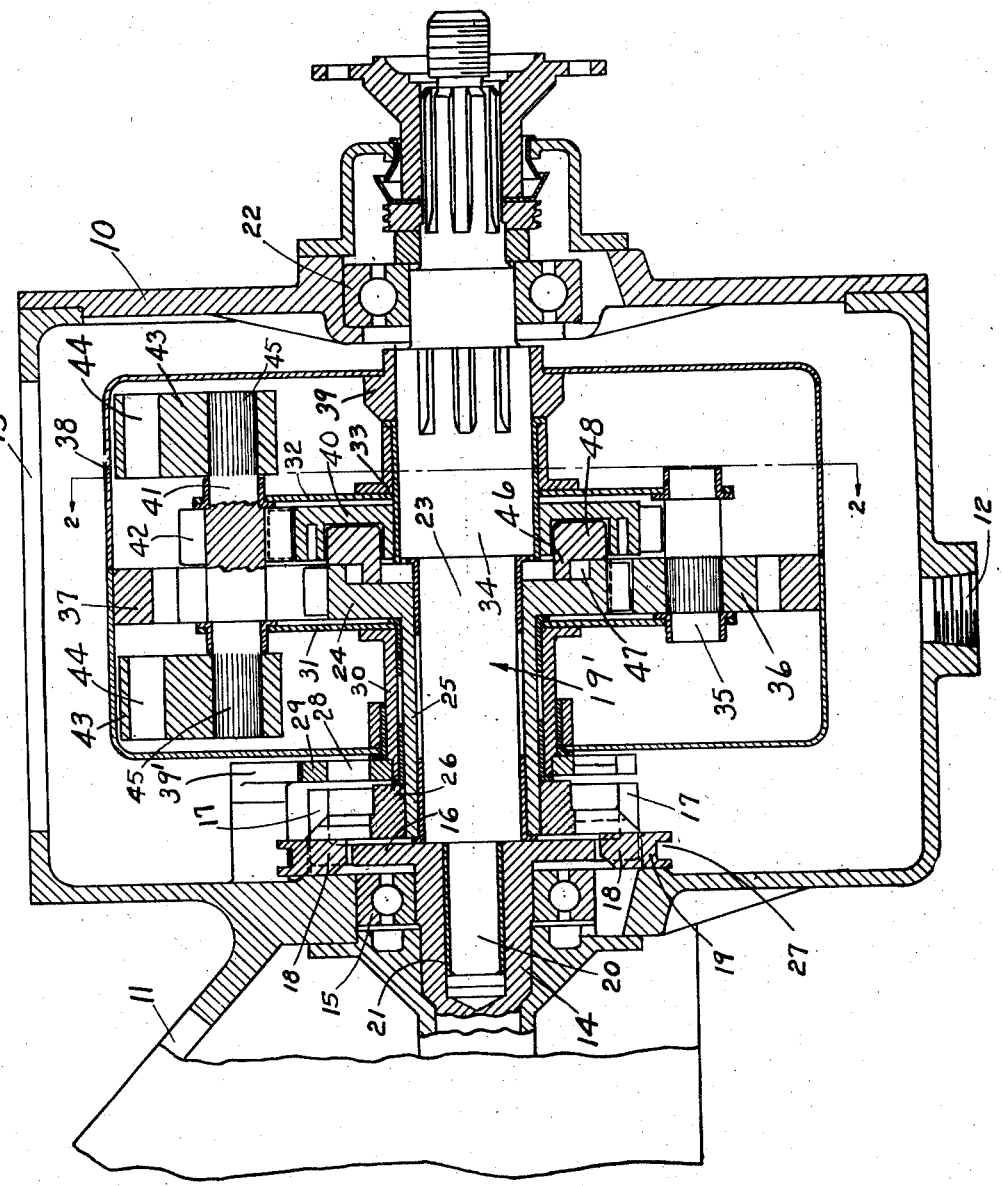
Figure 1 is a longitudinal section through the transmission.

Referring now to the drawings in detail, 10 represents a housing in which the transmission is enclosed. This housing is provided with a forwardly projecting extension 11 and the usual drain opening 12 and hand hole 13. The drive shaft 14 is journaled in the bearing 15 and is equipped with a rearwardly presented cupshaped flange 16 having diametrically opposed open slots 17 therein in which the confronting radial lugs 18 on the inner circumference of the control collar 19 are free to slide. In this way the collar 19 is mounted for sliding movement along the cupshaped flange 16 so that it may be selectively positioned at will in either of the two operating positions or a neutral non-operating position, the purpose of which will be presently described.

The driven shaft $19^1$ is preferably constructed with stepped diameters. The smaller diameter 20 being at the forward end of the shaft is received in an axial bore 21 in the driving shaft 14 and in which it is confined with freedom of rotation. The driving shaft extends through the housing 10 with a bearing provided therefor as at 22. Journaled on the intermediate diameter 23 of the shaft is a sun gear 24 which will be hereinafter referred to as the primary sun gear. This primary sun gear is provided with, or at least secured to a forwardly presented sleeve 25 which terminates in a notched or toothed ring 26. The interdental spaces between the notches or teeth in the ring 26 are adapted to accommodate lugs 18 on the control collar 19 and in this way connect the primary sun gear 24 in direct driving relation with the driving shaft 20.

This is accomplished by mounting the collar 19 on the cupshaped flange 16 so that it must rotate therewith by reason of the lugs 18 being confined in the slots 17. It so happens in the present illustration that the control collar 19 is shown in a position for reversing the drive. The position of the collar is determined by the manual manipulation of the hand lever A which is secured to a small shaft B projecting through the side of the cage 10 with the opposite end of the shaft having mounted thereon a rocker arm C. The end of the arm C fits in a socket D in one end of a fork E and the fork is slidably mounted on the shaft F. The opposite end of the fork fits into the groove 27 in the circumference of the control collar 19.

By manipulating the lever A to slide the fork E along the shaft F and as a result move the control collar 19 out of the reverse position shown in Figure 1, and into a forward drive position, the lugs 18 thereon will engage in slots 28 in the side of the ring 29 which is secured to, or forms a part of, the sleeve 30 which is journaled on the sleeve 25. The opposite end of the sleeve 30 is fixed to the side 31 of a two part planet spider. The opposite side 32 of the spider is journaled by the sleeve 33 on the larger diameter 34 of the driven shaft. In this way the drive for the forward speeds is taken in on the spider and not the sun gear, at least so far as concerns the preferred embodiment of the present invention. The two parts 31 and 32 of the spider are connected by spacers 31¹.

The planet spider carries a series of primary planet shafts 35 on which the mounted primary planet gears 36. These planet gears 36 mesh with the sun gear 24 and a ring gear 37 which in turn is fixed to a cage 38. The cage 38 is mounted in fixed relation to the driven shaft as at 39.

It will thus be seen that when the control ring 19 is moved into a position to connect the spider with the driving shaft forward speeds will be transmitted to the driven shaft through the cage 38. When the control collar 19 is moved into engagement with the sun gear for reverse speeds the rotation of the spider is arrested by means of a back stop mechanism suitable for the purpose such as the pawl 39' on the shaft F. This pawl is intended to move into engagement with the teeth on the periphery of the ring 29 when the collar 19 is moved out of engagement therewith.

It is of course understood that when the collar 19 is moved into a neutral position intermediate the forward and reverse driving positions both the forward and reverse drive through the transmission will be interrupted.

Mounted on the driven shaft 19 in juxtaposition relatively of the sun gear 24 is a secondary sun gear 40. The secondary sun gear is of larger diameter than the primary sun gear. Carried by the planet spider intermediate the planet shaft 35 and in spaced relation thereto are a series of secondary planet shafts 41, each of which having mounted thereon a secondary planet gear 42 in mesh with secondary sun gear 40. The shafts 41 are journaled in the spider so that their opposite ends project on opposite sides 31 and 32 of the spider. Eccentrically mounted on the projecting ends of the shafts 41 are a series of weights 43. These weights are made with a plurality of openings 44 which may be filled with lead to regulate the heft of the weights. The weights are serrated or otherwise secured to the shafts 41 as at 45, see Figure 1.

Attention is now directed particularly to Figure 4 which illustrates the overrunning clutch with which the secondary sun gear 40 is equipped. Before referring specifically to this clutching mechanism it will first be explained that the primary sun gear 24 is interlocked with the secondary sun gear 40 preferably by means of a series of lugs 46 which form a fixed part of the overrunning clutch mechanism and which are adapted to seat in the recesses 47 in the face of the primary sun gear.

The lugs 46 as best illustrated in Figure 4 are carried as a fixed part of a spiderlike spacer 48 of the overrunning clutch mechanism. This spacer is made with a plurality of radial projections 49, the outer edges of which being curved to correspond to the curvature of the inner circumference of the space in the secondary sun gear which accommodates the clutch mechanism and with which the projections have a wiping contact. The spaces between the lugs 49 are provided to accommodate rollers 50 which are disposed with their axes parallel with the axis of the driven shaft. As clearly illustrated in Figure 4 the rollers have a close fitting contact with the inner circumference of the sun gear and a taper surface 51 on the spacer 58. One of these bevel surfaces is provided for each of the rollers. It will thus be seen that the overrunning clutch mechanism permits the secondary sun gear to rotate in one direction but provides a positive back stop against rotation in an opposite direction. The rollers in the clutch mechanism are urged into wedging relation in the spaces in which they are accommodated by means of a spring pressed plunger 52 for each roller.

These plungers are mounted to project from the side of each of the radial projections 49.

Particular attention is directed to the fact that there is no back lash even to a minimum degree in this clutch mechanism as the rollers are at all times urged into wedging relation by means of the spring pressed plungers. The peculiar shape of the spaces in which the rollers act as wedges enables the clutch mechanism to function instantaneously as a back stop and therefore in no way interferes with the freedom of rotation of the sun gear in an opposite direction.

When the primary sun gear is rotating in one direction the secondary sun gear will be caused to rotate therewith, but when the primary sun gear is rotating in an opposite direction the overrunning clutch mechanism will permit rotation of the primary sun gear independently of the seconday sun gear.

When the collar 19 is shifted into a forward drive position and the driving shaft 14 is rotated the two part spider will be correspondingly rotated causing the primary sun gear 24 to be rotated in the same direction as the spider but at a much greater speed, it being assumed of course, that the ring gear 37 which is secured rigidly to the driven shaft by means of the cage 38, is stationary or nearly so.

The overrunning clutch mechanism between the primary and the secondary sun gears 24 and 40 respectively, will cause the secondary sun gear 40 to rotate and the resulting rotation of the secondary sun gear will drive the secondary planet gears 42.

As the secondary planet gears 42 rotate centrifugal force acts upon the weights 43 whereby to retard inward movement of the weights and accelerate outward movement of the same. The weights 43 when moving inwardly act through the gears 42, 40 and 24 to slow up the planetary movement between the gears 24 and 36, and such slowing up of the planetary movement reacts to rotate the ring gear 37 together with the driven shaft $19^1$ in a forward direction; the weights 43 when moving outwardly would serve to accelerate the planetary movement were it not for the function of the overrunning clutch mechanism. As the weights 43 move outwardly the secondary sun gear 40 is momentarily accelerated but such acceleration is not transmitted to the primary sun gear 24 because the overrunning clutch permits the secondary sun gear 40 to advance freely with respect to the primary sun gear. Because of this arrangement the centrifugal force resisting the inward movement of the weights 43 acts to cut down the planetary movement to pick up the ring gear, while the centrifugal force acting to accelerate the outward movement of the weights is neutral. When the resistance offered by the weights becomes sufficiently great by reason of a substantial balance of the torque between the driving and driven shafts the weights will entirely arrest or eliminate the planetary movement in the transmission and produce a one to one or unitary drive.

It will be seen from the illustration that the gear ratio in the mechanism particular as it applies relatively to the diameter of the secondary planet gears 42 has been designed with a view of increasing the leverage of the weights to a high degree of effective efficiency so that the retarding force developed in the movement of the planetary system will be not only entirely reliable for the general purpose intended but will function on heavy jobs where a more or less severe unbalanced torque between the driving and driven shafts is transmitted as a counter force in the planetary system.

It has been found in practice that the cooperative relationship of the parts of the overruning clutch herein described is one of the outstanding features of the present invention at least to the extent of its combination with the other feaures of the mechanism.

It will be seen that by raising of the supplemental planet gear arrangement the weights 43 are caused to rotate much faster than the planet gears 36. As the weights are rotated the inertia and centrifugal forces developed are transmitted to the planetary system as a constant retarding effect and by reason of the differences in size between the secondary planet gears 42 and the primary planet gears 36 the forces developed by the weights are multiplied in the planetary system.

The one way clutch mechanism eliminates any possibility of the weights accelerating the planetary movement so that the only forces imparted to the planetary system as a result of the action of the weights is a retarding force and this retarding force of course, is gradually increased as the speed of the driving shaft increases and as the torque between the driving and driven shafts gradually becomes more evenly balanced. When it is substantially balanced the weights have increased the retarding effect to the extent that the planetary movement is entirely arrested and the mechanism then operates as a unitary drive.

The secondary sun gear controls the rotation of the weights to the extent that they must all rotate in synchronism and inasmuch as both the inertia and centrifugal forces developed by the weights are converted into a retarding effect in the planetary system, such effect is constant and delivered without pulsations or interrupted frequencies which is, of course, quite desirable.

Having thus described and shown an embodiment of our invention, what we claim and desire to secure by Letters Patent of the United States is:

1. In a transmission, driving and driven shafts, speed changing mechanism connecting said shafts comprising a planetary gear train, and means for automatically controlling said mechanism, comprising a secondary gear train of different gear ratio than that of the corresponding gears in said first named gear train; a centrifugal weight connected in driving relation with a gear in said secondary gear train and a one way clutch connecting said gear trains.

2. In a transmission, driving and driven shafts, speed changing mechanism connecting said shafts comprising a planetary gear train, a sun gear in said gear train, means for connecting said sun gear with said driving shaft, and means for automatically controlling said mechanism, comprising a secondary gear train, a sun gear in said secondary gear train of different teeth ratio than that of the sun gear in the first named gear train, a one way clutch connecting said sun gears and a centrifugal weight connected with said secondary gear train.

3. In a transmission, driving and driven shafts, speed changing mechanism connecting said shafts comprising a planetary gear train having, a sun gear, planet gears and ring gear, and means for automatically controlling said mechanism, comprising a secondary gear train having a sun gear and planet gears of different gear ratio than that of the corresponding gears in said first named gear train, a centrifugal weight mounted to rotate with the planet gears in the secondary gear train, and a one way clutch connecting said sun gears;

4. In a transmission, driving and driven shafts, a planetary gear system connecting said shafts and means for automatically controlling said system comprising a gear train including a sun gear, planet gears and planet shafts on which said planet gears are mounted, said secondary gear train being of different gear ratio than said planetary system and the planet gears thereof meshing only with said sun gear, a one way clutch connecting said secondary gear train with said planetary system and a centrifugal weight mounted on said planet shafts to rotate therewith.

5. In a transmission, driving and driven elements, speed changing mechanism for connecting said elements in different speed ratios, a sun gear in said mechanism, planet gears meshing with said sun gear, a ring gear meshing with said planet gears and means for automatically changing the ratio, comprising a centrifugally controlled planetary gear train, a sun gear in said planetary gear train, planet gears meshing with said sun gear, a oneway clutch connecting said second named sun gear with said first named sun gear and said second named sun gear and said second named planet gears being of different gear ratio than that of the first named sun gear and first named planet gears.

In testimony whereof we have hereunto subscribed our names.

KENNETH E. LYMAN.
ROGER B. McMULLEN, Jr.